United States Patent

Coetzer et al.

[11] Patent Number: 5,604,053
[45] Date of Patent: Feb. 18, 1997

[54] ELECTROCHEMICAL CELL

[75] Inventors: Johan Coetzer, Pretoria; Isak L. Vlok, Verwoerdburg, both of South Africa

[73] Assignee: Electro Chemical Holdings Societe Anonyme, Luxembourg

[21] Appl. No.: 480,252

[22] Filed: Jun. 7, 1995

[30] Foreign Application Priority Data

Jun. 8, 1994 [ZA] South Africa .............................. 94/4028
Oct. 25, 1994 [ZA] South Africa .............................. 94/8384

[51] Int. Cl.⁶ ............................................... H01M 4/58
[52] U.S. Cl. ........................ 429/103; 429/104; 429/112; 429/218; 429/220; 429/223; 429/224; 29/623.1
[58] Field of Search ........................ 429/59, 101, 103, 429/104, 112, 218, 224, 223, 220; 29/623.1

[56] References Cited

U.S. PATENT DOCUMENTS

| | | |
|---|---|---|
| 3,503,808 | 3/1970 | Agruss et al. |
| 4,476,204 | 10/1984 | Auborn .............................. 429/196 |
| 4,529,676 | 7/1985 | Galloway et al. ....................... 429/103 |
| 4,546,055 | 10/1985 | Coetzer et al. ........................ 429/103 |
| 4,592,969 | 6/1986 | Coetzer et al. ........................ 429/50 |
| 4,626,483 | 12/1986 | Bones et al. ........................... 429/50 |
| 4,722,875 | 2/1988 | Wright ................................... 429/103 |
| 4,772,449 | 9/1988 | Bones et al. ........................... 419/2 |
| 4,797,333 | 1/1989 | Coetzer et al. ........................ 429/103 |
| 5,403,676 | 4/1995 | Coetzer et al. ........................ 429/50 |
| 5,476,733 | 12/1995 | Coetzer et al. ........................ 429/103 |

FOREIGN PATENT DOCUMENTS

| | | |
|---|---|---|
| 774204 | 10/1991 | South Africa . |
| 2226692 | 7/1990 | United Kingdom . |
| 9510784 | 7/1995 | United Kingdom . |

*Primary Examiner*—M. Nuzzolillo
*Attorney, Agent, or Firm*—Arnold, White & Durkee

[57] ABSTRACT

The invention provides an electrochemical cell, a cathode therefor and methods of making them. The cell is of the high temperature alkali metal/transition metal halide type, having a molten sodium anode, a nickel/nickel chloride cathode, an essentially sodium aluminium chloride molten salt electrolyte and a solid electrolyte sodium ion conducting separator which separates the sodium from the molten salt electrolyte. The nickel/nickel chloride is dispersed in solid form in a porous electronically conductive electrolyte-permeable matrix which is impregnated by the molten salt electrolyte, and antimony in finely divided solid form is mixed with the nickel/nickel chloride in the matrix. The mass ratio of antimony to the nickel in the nickel chloride in the cell in its fully charged state is 2:100–130:100.

7 Claims, 4 Drawing Sheets

ELECTROCHEMICAL CELL

BACKGROUND OF INVENTION

This invention relates to an electrochemical cell and to a method of making it. More particularly, it relates to an electrochemical cell having a sodium active anode material and a nickel/nickel chloride active cathode material; to a cathode for such cell; and to methods of making the cell and cathode.

SUMMARY OF INVENTION

According to one aspect of the invention, in an electrochemical cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing an alkali metal aluminium halide molten salt electrolyte comprising sodium cations and chloride anions, and having an Al:alkali metal atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having nickel/nickel chloride (Ni/NiCl$_2$) active cathode material dispersed in its porous interior, in finely divided particle- and/or thin layer form, in contact with the molten salt electrolyte and matrix, the sodium and molten salt electrolyte being in contact with and separated by the separator, to couple the Ni/NiCl$_2$ electrochemically with the sodium, there is provided the improvement whereby the porous interior of the matrix of the cathode contains antimony (Sb) mixed with and dispersed in finely divided solid form in the Ni/NiCl$_2$ active cathode material in the matrix, the cell having a fully charged state in which it has an open circuit voltage corresponding to the Na/NiCl$_2$ couple at the cell operating temperature and the Sb:Ni mass ratio between the Sb and the Ni in the NiCl$_2$ active cathode material in said fully charged state being 2:100–130:100.

For example, when the cell operating temperature (typically 250°–450° C.) is 300° C., the Na/NiCl$_2$ couple is 2,58 V.

The Sb:Ni mass ratio may be in the broad range 7:100–110:90, more specifically being in the range 20:110–90:110, preferably being 24:100–100:100, e.g. 30:90.

Conveniently the molten salt electrolyte is a sodium aluminium chloride (NaAlCl$_4$) molten salt electrolyte, which is optionally doped with fluoride ions as described in U.S. Pat. No. 4,592,969 or bromide ions as described in U.S. Pat. No. 5,403,676, the electrolyte and the cathode optionally being doped with sulphur or a suitable sulphide as described in U.S. Pat. No. 4,626,483. Said electrolyte separator is preferably a sodium β-alumina ceramic electrolyte, more preferably a sodium β''-alumina ceramic electrolyte. Preferably the matrix is porous metallic nickel, such as sponge nickel. In a particular embodiment the molten salt electrolyte may be a sodium aluminium chloride molten salt electrolyte, the separator being a sodium β''-alumina ceramic solid electrolyte and the matrix being porous metallic nickel.

The invention extends also to a cathode for the cell described above, the cathode comprising a porous electronically conductive matrix which is permeable to an alkali metal aluminium halide molten salt electrolyte in molten form, the matrix having Ni/NiCl$_2$ active cathode material dispersed in its interior in finely divided particle- and/or thin layer form, and the Ni/NiCl$_2$ active cathode material having Sb dispersed therein in finely divided solid form, the Ni/NiCl$_2$ and Sb partially occupying the porous interior of the matrix, and the cathode, when electrochemically coupled to a molten sodium anode having a fully charged state in which it exhibits an open circuit voltage corresponding to the Na/NiCl$_2$ couple at the cell operating temperature, the Sb:Ni mass ratio between the Sb and the Ni in the NiCl$_2$ active cathode material in said fully charged state being 2:100–130:100.

In more detail, the cathode may be as described above with reference to the cell of the present invention and, in particular, its porous interior may be impregnated with an alkali metal aluminium halide molten salt electrolyte containing sodium cations and chloride anions, and may contain fluoride and/or bromide anions and a sulphur/sulphide dopant as described above, dispersed in the electrolyte and/or active cathode material.

According to another aspect of the invention there is provided a method of making a cell as described above which comprises loading the cell or a precursor thereof with its constituents in a discharged- or over-discharged state and, prior to dispersing Ni/NiCl$_2$ active cathode material in the porous interior of the matrix, dispersing Sb in particulate metallic form in the active cathode material, and activating or conditioning the cell, after it is loaded, by charging the cell at the cell operating temperature by subjecting it to a charging potential to take it through a charge cycle up to its fully charged state, the charging voltage or -potential chlorinating the Ni but being kept sufficiently low to avoid chlorination of said Sb, the cathode or cathode precursor being coupled to the sodium anode in the cell or precursor thereof by the alkali metal aluminium halide molten salt electrolyte.

In other words, according to this other aspect of the invention there is provided a method of making a cell as described above which comprises loading the cell or a precursor thereof with its constituents in a discharged- or overdischarged state and, prior to loading, dispersing Ni/NiCl$_2$ active cathode material in the porous interior of the matrix, dispersing Sb in particulate metallic form in the active cathode material and activating or conditioning the cell, after it is loaded, by charging the cell at the cell operating temperature by subjecting it to a charging potential to take it through a charge cycle up to its fully charged state, the charging voltage or -potential being kept below the chlorination potential of Sb, at the cell operating temperature and above the chlorination potential of Ni at that temperature, the cathode or cathode precursor being coupled to the sodium anode in the cell or its precursor by the alkali metal aluminium halide molten salt electrolyte.

It follows that the charging voltage must remain between the open circuit voltage of the Na/NiCl$_2$ couple, at the cell operating temperature and open circuit voltage of the Na/SbCl$_2$ at the cell operating temperature. For example, at 300° C. the charging voltage should be kept in the range of 2,58 V (the open circuit voltage for the Na/NiCl$_2$ couple at 300° C.) –2,78 V (the open circuit voltage for the Na/SbCl$_2$ couple at 300° C.). Thus the charging voltage should be sufficient to chlorinate Ni only and below that needed to chlorinate Sb. In other words, Na/NiCl$_2$ open circuit voltage<charging voltage<Na/SbCl$_2$ open circuit voltage. Cell operating temperatures are usually 200°–400° C., typically 250°–350° C. and must be sufficient for the anode material and molten salt electrolyte to be molten.

Methods of loading the cell in a discharged or overdischarged state are described in U.S. Pat. Nos. 4,529,676, 4,722,875, 4,797,333, 4,772,449, and British Patent 2,226, 692, and it is contemplated that the cell will usually be loaded with a precursor of the cathode, which is a mixture in particulate form containing the Sb dispersed therein. This precursor may be cold pressed into granules having a size of 250–1000 μm.

The invention extends to a method of making a cathode for use in a cell as described above, which comprises forming an electrolyte-permeable electronically conductive matrix, and dispersing active Ni/NiCl$_2$ cathode material in its discharged state in the porous interior of the matrix, the method including dispersing Sb in finely divided particulate metallic form in the active cathode material before the active cathode material is dispersed in the matrix, and activating or conditioning the cathode by subjecting it, in a cell in which it is coupled with a sodium anode by an alkali metal aluminium halide molten salt electrolyte, to a charging potential at the cell operating temperature to take it through a charge cycle up to its fully charged state, the charging voltage or potential being kept sufficiently low to avoid chlorination of any of the Sb.

In the making of the cell or cathode in accordance with the method of the invention, the molten salt electrolyte may be as described above for use in the cell or cathode of the invention; and once again, the cell or cathode made in accordance with the invention may, in more detail, be in accordance with the cell and cathode of the present invention as described above; and the making of the cathode may in more detail, may be as described above for the making of the cell.

By fully charged state of the cell or cathode is meant the state in which all the available Ni in tile porous interior of the matrix has been converted by the charging potential to NiCl$_2$. It will be appreciated that the cathode of the present invention may be used in the cell in which it is formed and/or activated, or, after activation in an activating- or conditioning cell, it may be removed for loading into, and use in, another cell.

The invention also extends to an electrochemical cell and cathode therefor, whenever made in accordance with a method as described above.

BRIEF DESCRIPTION OF THE DRAWINGS

The invention will now be described by way of non-limiting illustration, with reference to the following Examples and with reference to the accompanying drawings, in which:

In FIG. 1 a test cell according to the invention is generally designated 10. The cell 10 has housing in the form of a casing 12 of square cross-section made of mild steel containing, centrally suspended therein, a sodium β"-alumina separator tube 14. The tube 14 is glass-welded at 16 to an α-alumina insulating collar 18. A pressed nickel lid 20 for the casing 12 is sealingly thermocompression-bonded to the upper surface of the collar 18 at 22, the lid 20 having an upstanding rim 24 welded into the open end of the casing 12.

Figure 1:
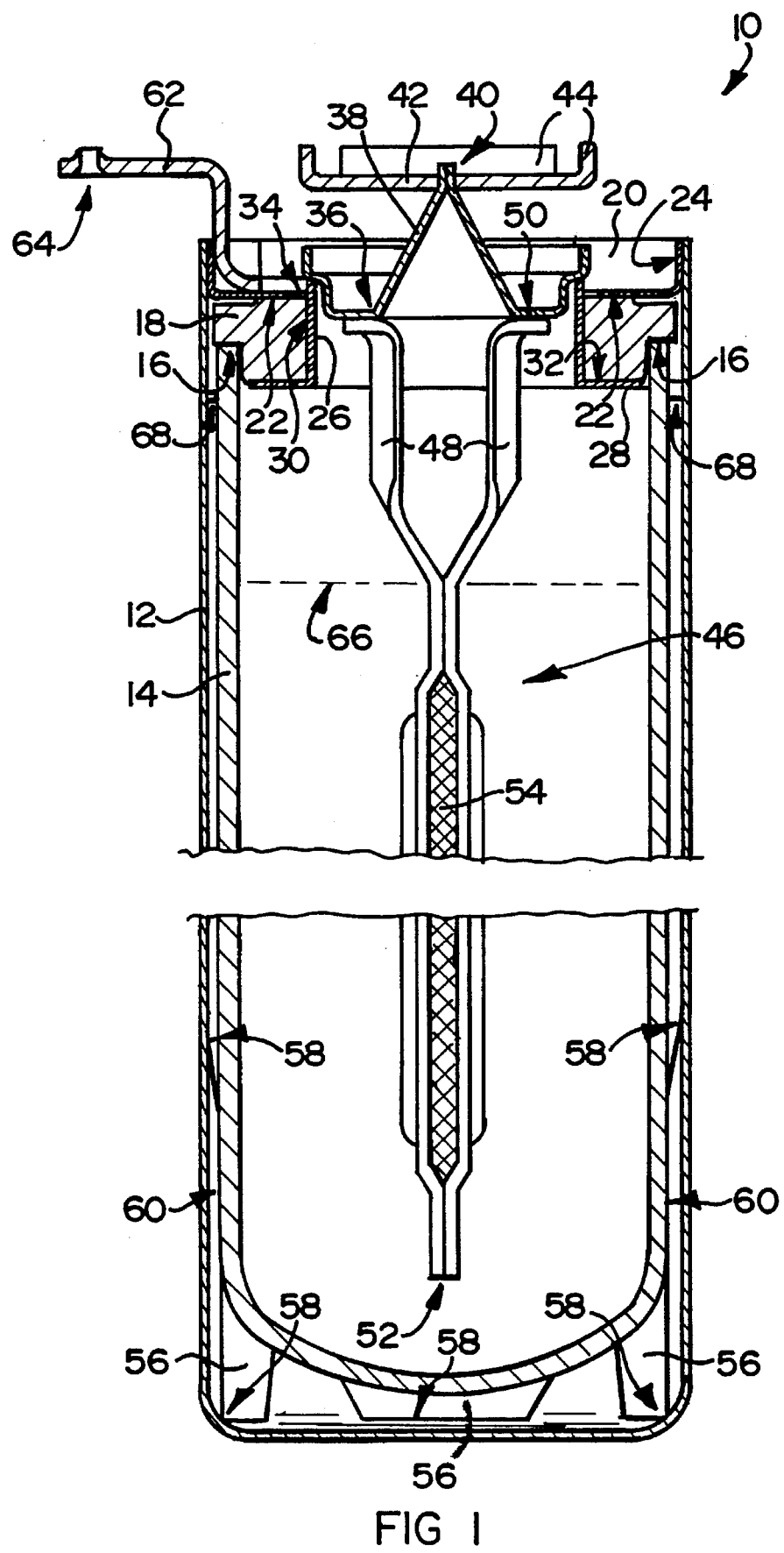
FIG. 1 shows a schematic sectional side elevation of a cell according to the invention.

A nickel tube 26 having a radially projecting circumferentially extending flange 28 is sealingly thermocompression-bonded to the collar 18 in the radial direction at 30 and, via the flange 28, to the lower surface of the collar 18 at 32. The upper edge of the tube 26 stands upwardly proud of the upper surface of the collar 18 and is separated from the inner edge of the lid 20 by an insulating space at 34. A cup-shaped nickel pressing 36 is welded sealingly on to the upper edge of the tube 26. The pressing 36 has a central upstanding filler tube 38 whose upper end 40 (seen edge-on in the drawing) is crimped dosed so that it is chisel-shaped, and this upper end 40 is welded into a slot in a square (in plan view) mild steel cathode terminal plate 42 having upstanding rims 44 at its edges.

A nickel cathode current collector 46 has two limbs 48 welded to the floor 50 of the pressing 36 and whereby it is suspended to extend downwardly to a lower end at 52 spaced closely above the lower dosed end of the separator tube 14. The current collector 46 is shaped to embrace an elongated carbon felt molten salt electrolyte wick 54 which extends vertically along the interior of the separator tube 14, the wick 54 being exposed along its length to the interior of the tube 14.

The lower end of the space between the casing 12 and the separator tube 14 is provided with four mild steel wicking shims 56, circumferentially spaced from each other and shaped to be in contact with the casing at 58 and with the tube at 60. The casing 12 is provided with a mild steel anode terminal 62, welded into the lid 20 and having a slot 64 for receiving a rim 44 of the cathode terminal plate 42 of an adjacent like cell 10.

A cathode (not shown but described hereunder) fills the tube 14 up to the level 66 and molten sodium anode material (not shown) fills the space between the tube 14 and casing 12 up to the level 68.

To load a precursor of the cell a homogeneous powder mixture is formed from antimony metal powder (5–53 μm, e.g. 44 μm, in particle size), nickel powder (2–10 μm, e.g. 2–5 μm in particle size), NaCl powder (53–250 μm, e.g. 53 μm in particle size), FeS powder (53–150 μm, e.g. 125 μm in particle size) and aluminium powder (53–150 μm, e.g. 125 μm in particle size). The powder mixture is then granulated to form self-supporting granules of a granule size of 250 μm<granule size<1000 μm, and the granules are charged into the tube 14 via the filler tube 38, tamped until they are tap dense and fill the tube 14 to level 66. The cell is than heated to 290° C. and the tube 14 is charged via the tube 38 with 125–130 g of molten NaAlCl$_4$, followed by crimping shut of the top of the tube 38 at 40 and welding thereto of the plate 42. Typically the assembly of the cell will involve connecting together the collar 18 with the tube 14, lid 20, terminal 62, tube 26, pressing 36 and cathode current collector 46, followed by loading as described above with the crimping of the tube end 40 and attachment of the plate 42 to the end 40 of the tube 38. Finally, the lid 20 can be welded into the casing 12 at 24, after the shims 56 have been inserted into the casing 12. The molten NaAlCl$_4$ electrolyte impregnates the powder mixture and is wicked upwardly by the felt 54; and the shims 56 provide electronic contact between the tube 14 and the casing 12 and act to wick molten sodium (upon charging as described hereunder) upwardly between the casing 12 and tube 14, while acting initially as anode current collectors. The crimping at 40 and the welding at 24 take place under vacuum.

EXAMPLE 1

(Invention)

A cell precursor was loaded as described above, with cathode/molten salt electrolyte precursor mixture in its cathode compartment, and no sodium in its anode compartment, the precursor mixture having the following composition:

| Constituent | Mass (g) |
|---|---|
| Sb | 94,5 |
| Ni | 51,3 |
| NaCl | 93,3 |
| NaF | 4,7 |
| FeS | 3,9 |
| Al | 2,2 |
| TOTAL | 249,9 |

The cell precursor was heated to a cell operating temperature of 300° C. and was subjected to a charging potential of 2,58–2,78 V at a constant charging current of 2,5 A to cause the chemical and/or electrochemical reactions whereby:

$$4NaCl + Al \rightarrow NaAlCl_4 + 3Na; \quad \text{Reaction (1)}$$

and

$$2NaCl + Ni \rightarrow NiCl_2 + 2Na \quad \text{Reaction (2)}$$

The NiCl$_2$ formed charged active cathode material and the NaAlCl$_4$ formed molten salt electrolyte, the Na migrating in ionic form through the separator into the anode compartment to form active anode material. The charging potential was discontinued when all the available Ni had been consumed, at which stage the cathode compartment contained a matrix formed from the residual metallic Ni, a residual amount of NaCl being dispersed in the matrix in solid form to ensure that the Al:Na atomic ratio in the cathode did not exceed 1:1, the Sb in turn being dispersed in the NiCl$_2$ active cathode material, together with the FeS (sulphide dopant), fluoride cations (fluoride dopant) being dispersed (dissolved) in the molten salt electrolyte. The NiCl$_2$ was dispersed in the matrix which was saturated with the NaAlCl$_4$. The mass ratio between the Sb and the Ni in the NiCl$_2$ active cathode material was 106:94.

EXAMPLE 2

(Invention)

Example 1 was repeated with the following cathode/molten salt electrolyte precursor mixture in the cathode compartment:

| Constituent | Mass (g) |
|---|---|
| Sb | 28,6 |
| Ni | 11,2 |
| NaCl | 93,3 |
| NaF | 4,7 |
| FeS | 4,0 |
| Al | 2,2 |
| TOTAL | 144,0 |

In this case, after charging, the Sb:Ni mass ratio of Sb to Ni in the NiCl$_2$ active cathode material was 50:150.

Tests carried out on this cell confirmed the beneficial results set forth hereunder for the cell of Example 1, compared with the control of Example 4.

EXAMPLE 3

(Invention)

Examples 1 and 2 were repeated with the following cathode/molten salt electrolyte precursor mixture in the cathode compartment:

| Constituent | Mass (g) |
|---|---|
| Sb | 30,0 |
| Ni | 115,8 |
| NaCl | 93,3 |
| NaF | 4,7 |
| FeS | 4,0 |
| Al | 2,2 |
| TOTAL | 250,0 |

In this case, after charging, the Sb:Ni mass ratio of Sb to Ni in the NiCl$_2$ active cathode material was 25,9:100.

EXAMPLE 4

(Control-No Sb)

Examples 1, 2 and 3 were repeated, but with the following cathode/molten salt electrolyte precursor mixture in the cathode compartment:

| Constituent | Mass (g) |
|---|---|
| Ni | 144,3 |
| NaCl | 103,7 |
| NaF | 4,38 |
| FeS | 4,38 |
| Al | 2,23 |
| TOTAL | 258,99 |

Results

After conditioning by means of Reactions (1) and (2) the cells of Examples (1), (2) and (3) were found to be capable of accepting large charging currents without any interference from any Na/SbCl$_3$ couple.

Figure 2:
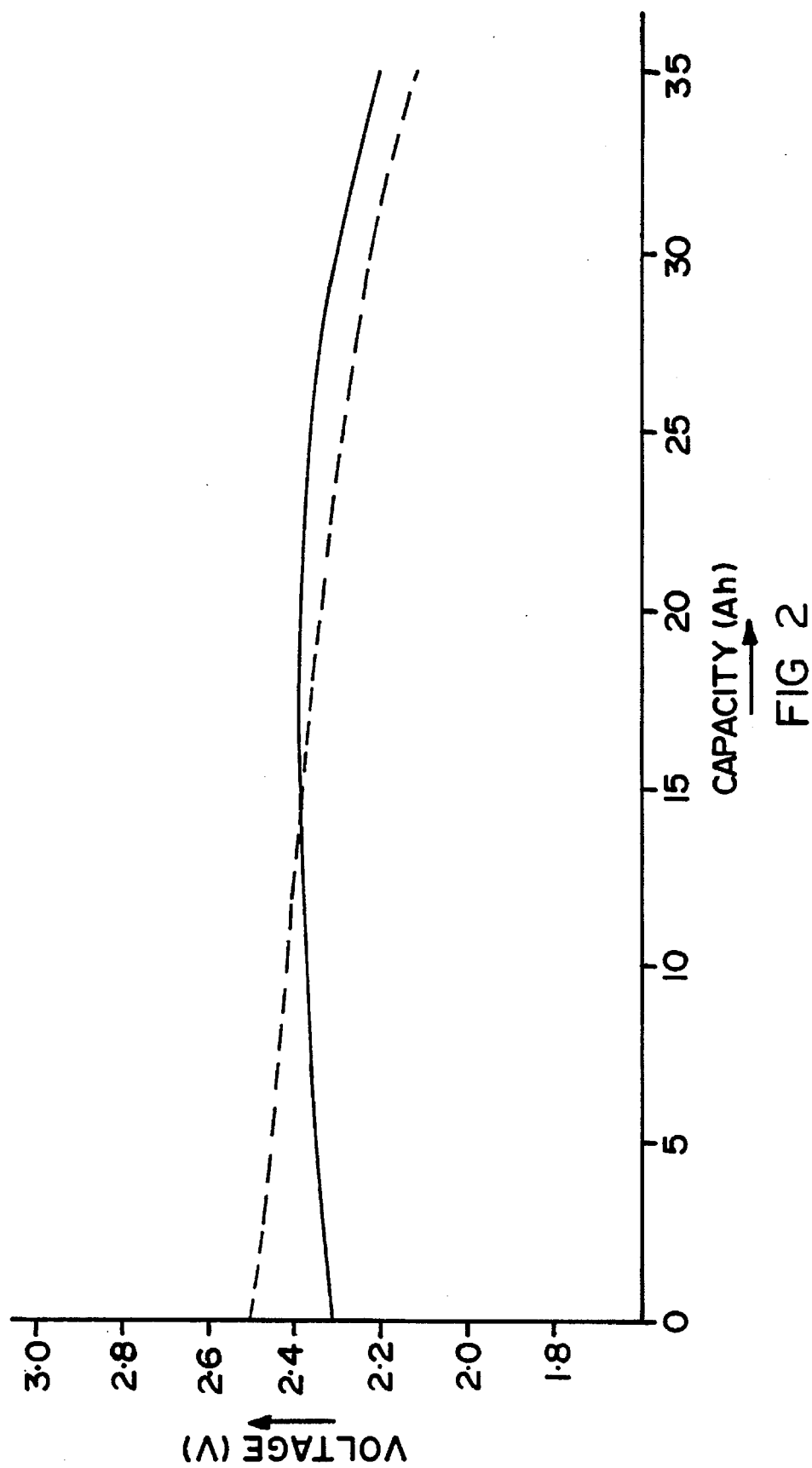
FIG. 2 shows plots of cell voltage in volts (V) against state of discharge of the cell (Ah), both for a cell in accordance with the present invention made by the method of the present invention, and for a control cell which is similar to the cell according to the invention and was made in the same fashion, except that its cathode contained no dopant metal, for the 10th discharge cycle.
Figure 3:
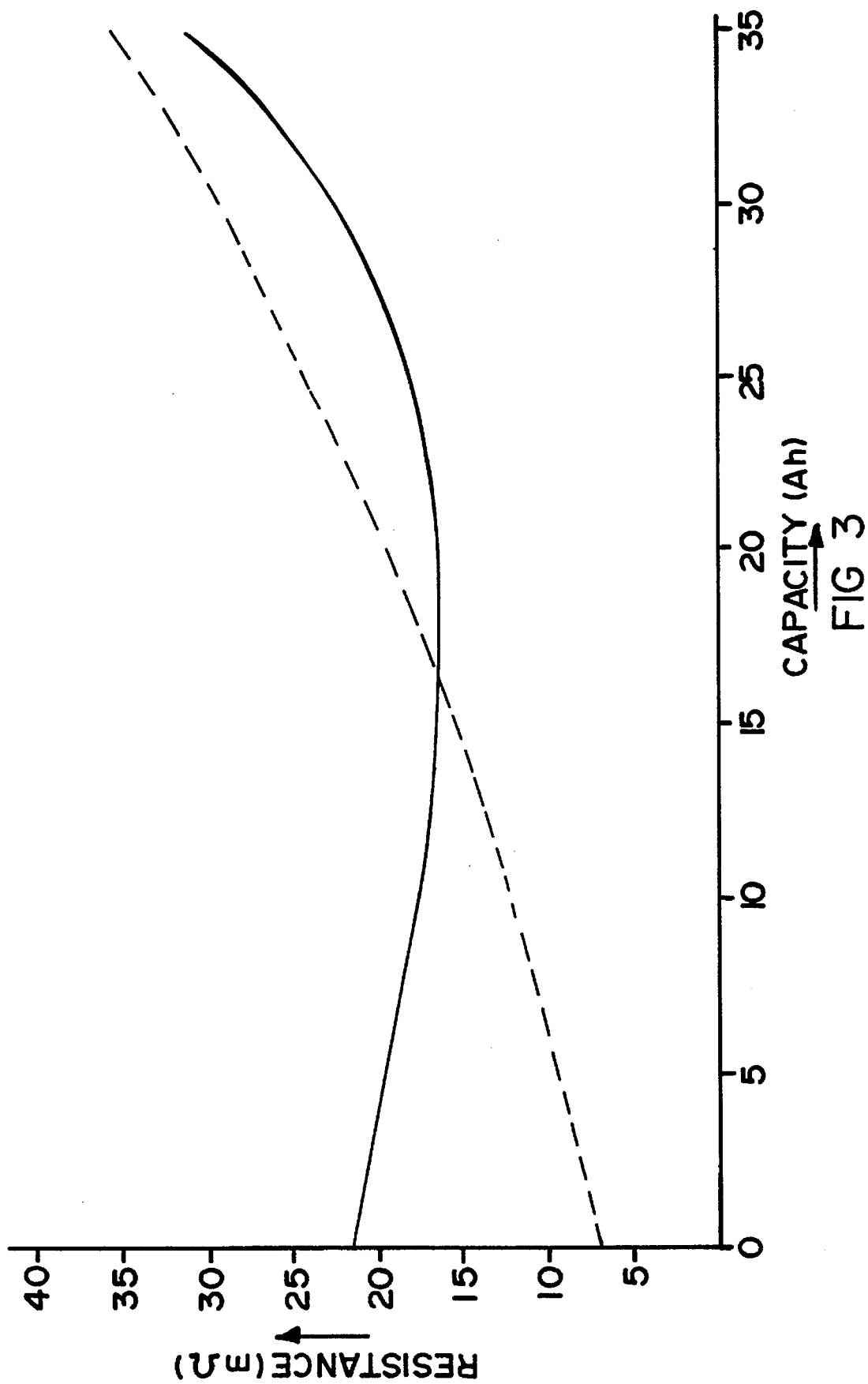
FIG. 3 shows a plot of cell internal resistance (mΩ) against the state of discharge of the cell expressed in ampere hours (Ah), for the cells whose voltage against capacity plots are shown in FIG. 2, for the 10th discharge cycle.

FIG. 2 shows, for the cell according to the invention of Example 1 (solid line—which had a theoretical capacity of 37 Ah) and for the control cell of Example 4 (dotted line—which had a theoretical capacity of 40 Ah), the first part of the 10th discharge cycle for a 3-hour discharge period at a discharge current of 12 A down to a cut-off voltage of 1,65 V, when operated at 300° C. FIG. 2 demonstrates that the cells of Examples 1 (invention) and 4 (control) have broadly similar discharge characteristics, but that the cell of Example 1 according to the invention appears to benefit from reduced polarization (believed to be primarily concentration polarization) after about 15 Ah of capacity had been discharged, compared with the control, there being clearly less polarization in this cell than in the control after 20 Ah of capacity had been discharged, which reduced polarization continued for the remainder of the discharge cycle, leading to substantially enhanced power characteristics during the second half of the discharge cycle and a flatter discharge curve in terms of voltage, compared with the control. This is further illustrated in FIG. 3 for the cells of Examples 1 and 4, from which Figure it is clearly apparent that the internal resistance of the cell according to the invention (solid line), while initially somewhat higher than that of the control (dotted line), drops below that of the control after about 17 Ah of discharge and remains below it until the end of the discharge cycle.

Figure 4:
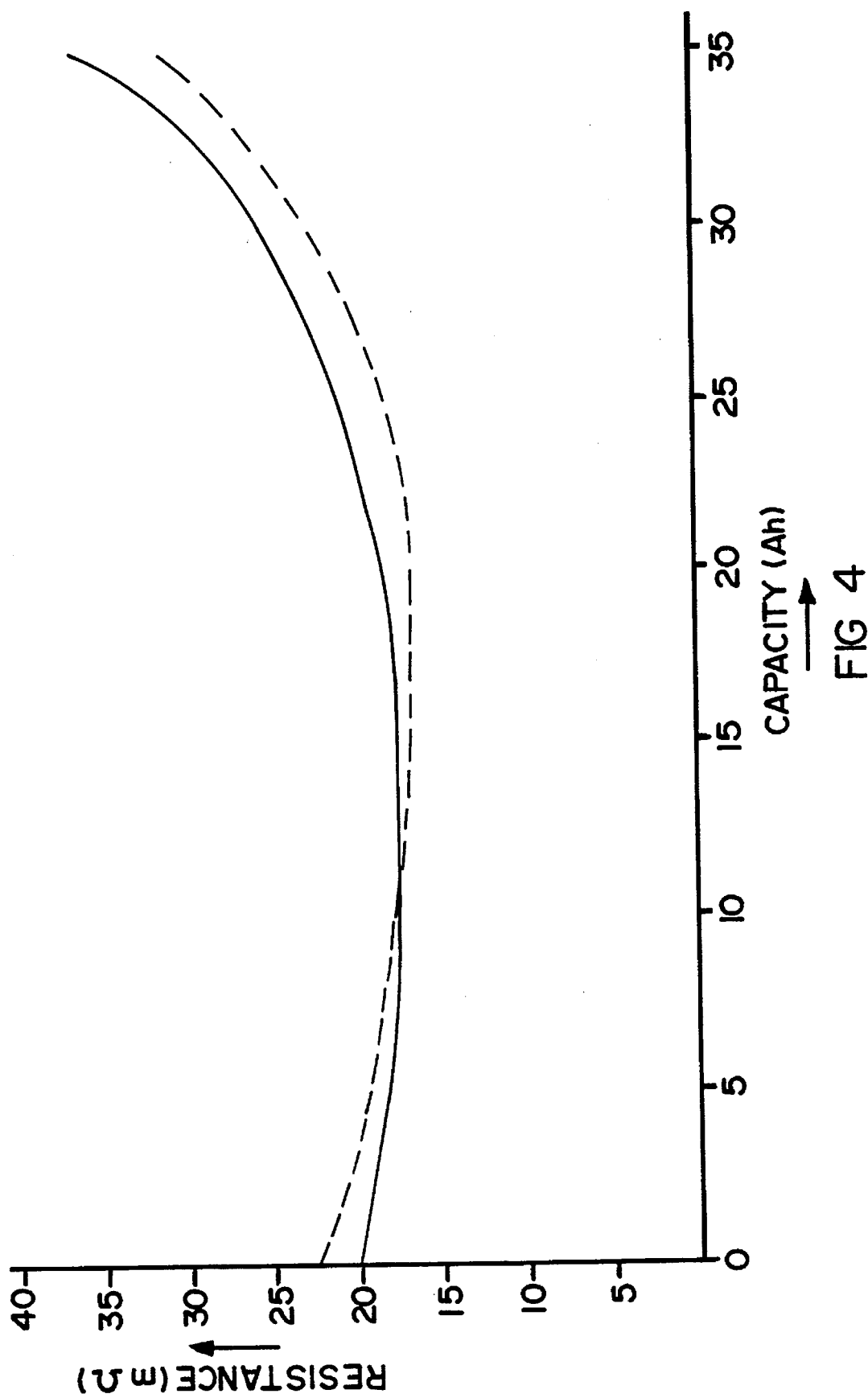
FIG. 4 shows plots similar to those of FIG. 3 for the cell in accordance with the invention whose voltage against capacity plot is shown in FIG. 2, respectively for the 5th and 50th discharge cycles.

Upon subjecting cells according to the invention to charge/discharge cycles at 300° C. at a constant charging current of 2,5 A with a charging voltage above 2,58 V and below an upper cut-off voltage of 2,78 V for a 14 hour charging period, and at a constant discharge current of 12 A down to a cut-off voltage of 1,65 V for a 3 hour discharge period, no material capacity loss or internal resistance rise was found to take place between the 5th cycle (solid line) and the 50th cycle (dotted line) (See FIG. 4 for the cell of Example (1)).

The cell of Example 1 (invention) also shows improvement compared with that of Example 4 (control) with regard to peak power availability. This is demonstrated in the following Table, which illustrates power pulse measurements carried out at regular intervals (after 5, 15, 25, 30 and 35 Ah of discharge had taken place respectively) for periods of 0, 5, 10, 20 and 30 seconds respectively at a 1,7 V and 17 A discharge rate. Except for the measurements after 5 Ah of discharge, which showed a drop (compared with the control) in the peak power pulses lasting up to 30 seconds, peak power pulses of up to 30 seconds were all substantially better for the cell of Example 1 according to the invention than for the control cell, varying (for the 30-second pulses) from an improvement in power of 21,6% after 15 Ah of discharge, up to 54,4% after 30 Ah of discharge.

acteristics. It is also possible that the presence of Sb in this form can retard Ni crystal growth in the cathode which can cause capacity loss and/or internal resistance rise in cells in accordance with Example 4 (control). Actual participation of Sb in the cell reaction can, however, not to be ruled out; and it is possible when Sb is employed that, initially, Sb, in association with Ni, is chlorinated to $SbCl_3$, but dissolves in the $NaAlCl_4$ melt to form species such as $NaCl\ AlCl_3\ SbCl_3$, which can potentially enhance the further solubility in the molten salt electrolyte of NaCl at 300° C., to leach discharged NaCl from the cathode matrix, thereby to promote said open matrix structure, and reduced polarization characteristics.

What is claimed is:

1. An improved electrochemical cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing an alkali metal aluminum halide molten salt electrolyte comprising sodium cations and chloride anions, and having an Al:alkali metal atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having nickel/nickel chloride ($Ni/NiCl_2$) active cathode material dispersed in its porous interior, in divided particle- and/or layer form, in contact with the molten salt electrolyte and matrix, the sodium and molten salt electrolyte being in contact with and separated by the separator, to couple the $Ni/NiCl_2$ electrochemically with the sodium, wherein the improvement comprises antimony contained in the porous interior of the matrix of the cathode, said porous interior containing the antimony (Sb) mixed with and dispersed in divided solid form in the $Ni/NiCl_2$ active cathode material in the matrix, the cell having a fully charged state in which it has an open circuit voltage corresponding to the $Na/NiCl_2$ couple at the cell operating temperature and the Sb:Ni mass ratio between the Sb and the Ni in the $NiCl_2$ active cathode material in said fully charged state being 2:100–130:100.

2. A cell as claimed in claim 1, in which the Sb:Ni mass ratio is 7:100–110:90.

TABLE

| CELL | Ah | PULSE 0 SEC WATTS | PULSE 5 SEC WATTS | PULSE 10 SEC WATTS | PULSE 20 SEC WATTS | PULSE 30 SEC WATTS | % IMPROVEMENT |
|---|---|---|---|---|---|---|---|
| Ni | 5 | 131,2 | 130,5 | 130 | 129 | 129 | −73,8% |
| Sb—Ni | 5 | 74,5 | 74,2 | 74,2 | 74,2 | 74,2 | |
| Ni | 15 | 116,8 | 94,7 | 91 | 89 | 88,5 | +21,6% |
| Sb—Ni | 15 | 109 | 107,6 | 107,6 | 107,6 | 107,6 | |
| Ni | 25 | 93,5 | 79,6 | 73,7 | 69,6 | 67,7 | +47,8% |
| Sb—Ni | 25 | 108,5 | 107,6 | 104,6 | 102,0 | 100,1 | |
| Ni | 30 | 80 | 70,9 | 67,4 | 63,9 | 61,8 | +54,4% |
| Sb—Ni | 30 | 108 | 107,6 | 102,7 | 99,3 | 95,4 | |
| Ni | 35 | 60,5 | 56,9 | 55,4 | 53,4 | 52,3 | +53,7% |
| Sb—Ni | 35 | 99.1 | 95,9 | 92,7 | 85,8 | 80,4 | |

The role of Sb in reducing polarization is not clear, but, without being bound by theory, the Applicant believes that the finely divided Sb appears to function as a stabilizing conductive backbone in the cathode matrix, either alloyed or otherwise bound to the nickel of the matrix, thereby promoting maintenance of an open matrix structure, with enhanced porosity, giving rise to reduced polarization char- 3. A cell as claimed in claim 2, in which the Sb:Ni mass ratio is 24:100–100:100.

4. A cell as claimed in claim 1, in which the molten salt electrolyte is a sodium aluminium chloride molten salt electrolyte, the separator being a sodium β"-alumina ceramic solid electrolyte and the matrix being porous metallic nickel.

5. A cathode for a cell as claimed in claim 1, the cathode comprising a porous electronically conductive matrix which is permeable to an alkali metal aluminum halide molten salt electrolyte in molten form, the matrix having $Ni/NiCl_2$ active cathode material dispersed in its interior in divided particle- and/or layer form, and the $Ni/NiCl_2$ active cathode material having Sb dispersed therein in divided solid form, the $Ni/NiCl_2$ and Sb partially occupying the porous interior of the matrix, and the cathode, when electrochemically coupled to a molten sodium anode having a fully charged state in which it exhibits an open circuit voltage corresponding to the $Na/NiCl_2$ couple at the cell operating temperature, the Sb:Ni mass ratio in the $NiCl_2$ active cathode material in said fully charged state being 2:100–130:100.

6. A method of making a cell as claimed in claim 1, which method comprises loading the cell or a precursor thereof with its constituents in a discharged- or overdischarged state and, prior to dispersing $Ni/NiCl_2$ active cathode material in the porous interior of the matrix, dispersing Sb in particulate metallic form in the active cathode material, and activating or conditioning the cell, after it is loaded, by charging the cell at the cell operating temperature by subjecting it to a charging potential to take it through a charge cycle up to its fully charged state, the charging voltage or -potential chlorinating the Ni but being kept sufficiently low to avoid chlorination of any of said Sb, the cathode or cathode precursor being coupled to the sodium anode in the cell or precursor thereof by an alkali metal aluminium halide molten salt electrolyte.

7. A method for making a cathode for use in a cell as claimed in claim 1, which comprises forming an electrolyte-permeable electronically conductive matrix, dispersing active $Ni/NiCl_2$ cathode material in its discharged state in the porous interior of the matrix, the method including dispersing Sb in divided particulate metallic form in the active cathode material before the active cathode material is dispersed in the matrix, and activating or conditioning the cathode by subjecting it, in a cell in which it is coupled with a sodium anode by an alkali metal aluminum halide molten salt electrolyte to a charging potential at the cell operating temperature to take it through a charge cycle up to its fully charged state, the charging voltage or potential being kept sufficiently low to avoid any chlorination of the Sb.

* * * * *